Figure 2:
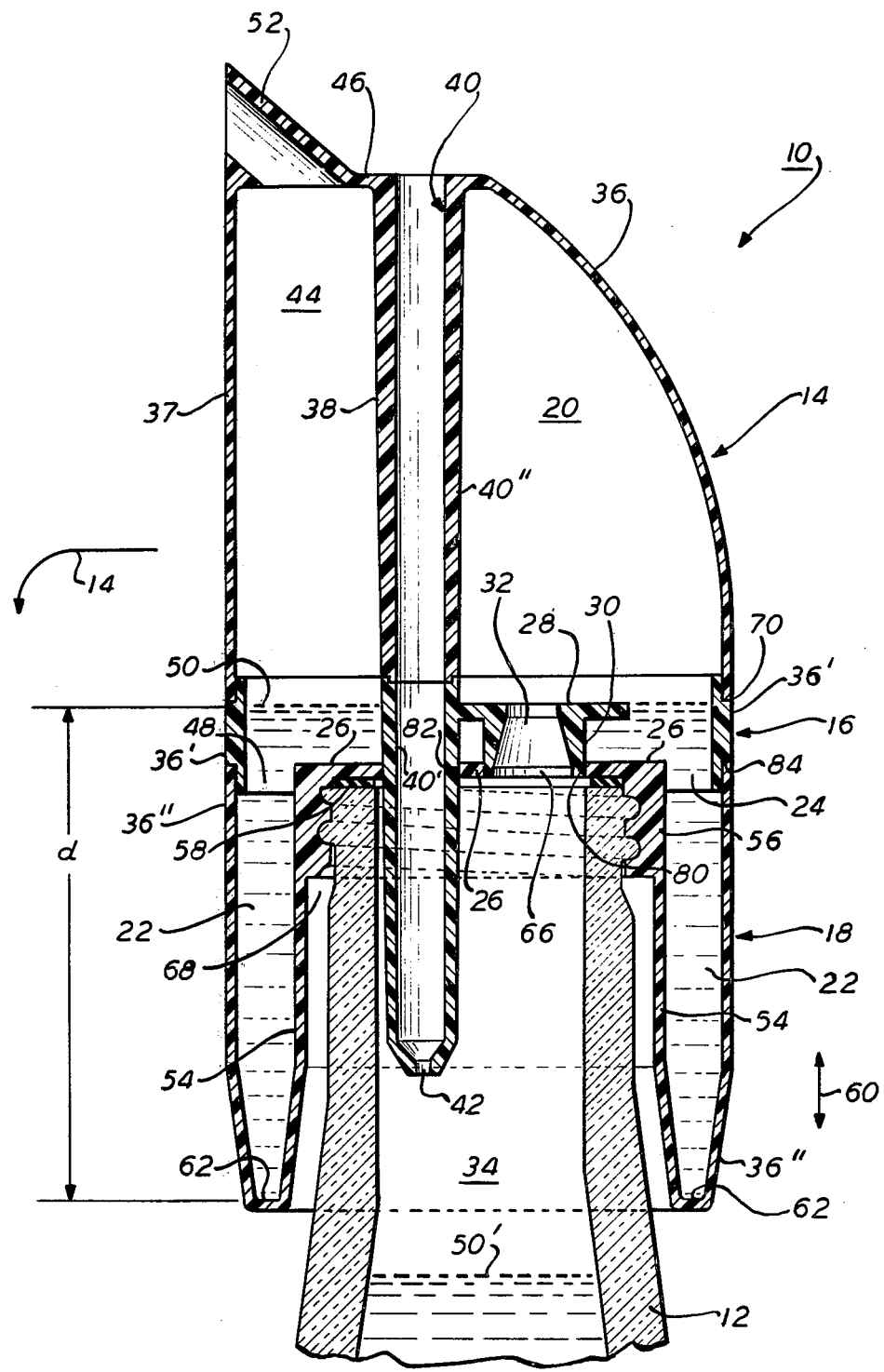

United States Patent [19]

Downing et al.

[11] 4,183,450
[45] Jan. 15, 1980

[54] METERING DEVICE

[75] Inventors: Neil H. Downing, 52 S. Pine St., Katonah, N.Y. 10536; Edward M. Brown, Livingston; Edward J. Towns, Convent Station, both of N.J.

[73] Assignee: Neil Hugh Downing, Katonah, N.Y.

[21] Appl. No.: 729,995

[22] Filed: Oct. 6, 1976

[51] Int. Cl.² ............................................. G01F 11/26
[52] U.S. Cl. ...................................... 222/455; 222/478
[58] Field of Search ................ 222/454, 455, 478, 584

[56] References Cited

U.S. PATENT DOCUMENTS

| 1,066,127 | 7/1913 | Lewis | 222/455 |
| 3,139,224 | 6/1964 | Bloom | 222/478 |

FOREIGN PATENT DOCUMENTS

| 230293 | 3/1959 | Australia | 222/455 |
| 178827 | 6/1954 | Austria | 222/455 |
| 450829 | 7/1936 | United Kingdom | 222/455 |
| 497199 | 12/1938 | United Kingdom | 222/455 |

Primary Examiner—Joseph J. Rolla
Assistant Examiner—Frederick R. Handren

[57] ABSTRACT

A device for pouring and measuring a volume of fluid from a container threaded to the device includes a liquid storage chamber disposed above the container when upright. An opening in the storage chamber receives fluid from the container when inverted. A vent tube connects the ambient to the container interior. A volume measuring chamber is disposed beneath and connected to the storage chamber via a fluid passage so that fluid in the storage chamber pours into the measuring chamber through the passage when the container is upright. The opening in the storage chamber connected to the container interior has a predetermined spaced relationship above the measuring volume chamber for dumping liquid in excess of the measured volume back into the upright container. A pour chamber receives the measured volume when the container is inverted for preventing the measured volume fluid from returning to the storage chamber through the fluid passage.

8 Claims, 4 Drawing Figures

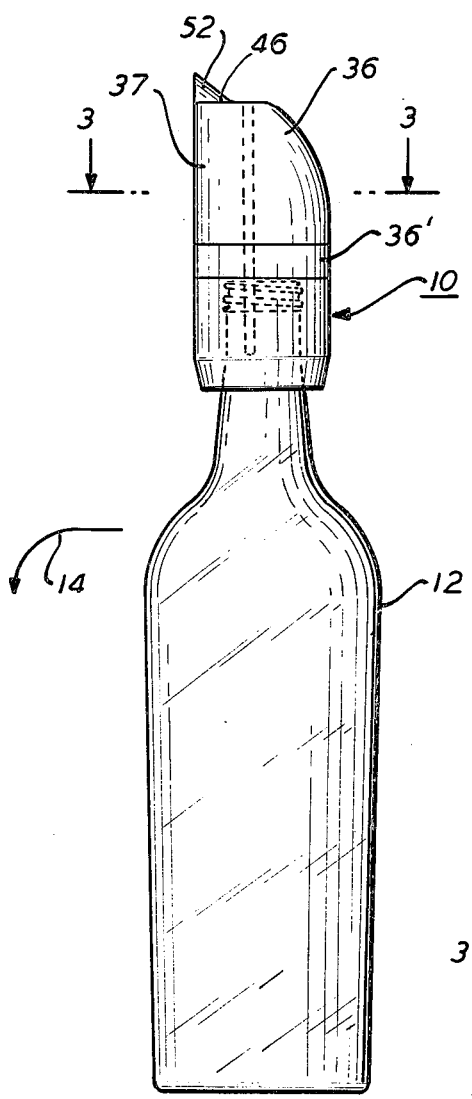
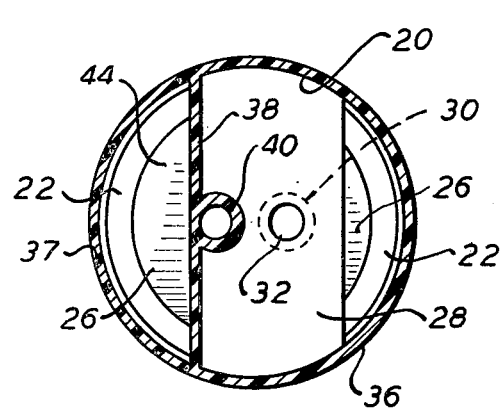
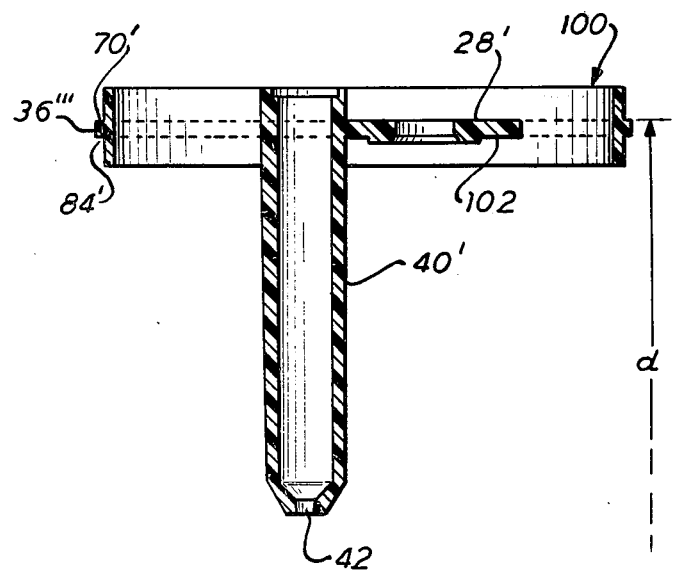

METERING DEVICE

The present invention relates to metering devices for measuring and pouring a volume of a fluid.

Prior art metering and pouring devices, e.g., spouts, are widely used to prepare drinks wherein the device serves to meter and pour the contents of a liquor bottle into a glass. The liquor, being a relatively expensive commodity, is poured to a predetermined measure commonly referred to as "shot" measures. To aid in such measuring, "shot" glasses also may be provided. In one instance, the pouring spout is merely a nozzle attached to the bottle for providing an easy pour into the "shot" glass. Often to save time, employees of establishments using such techniques may forego the "shot" glass and estimate the measure pour by "eye". This method can be costly due to the excess volumes that might be poured.

Other pouring spouts are commercially available for providing premeasured "shots" during the pouring processes, however, such devices are relatively slow and inconvenient. Such devices may include passive units which provide a measured flow in accordance with a valve system and a number of chambers. One such system is disclosed and described in our co-pending patent application Ser. No. 699,689 filed June 25, 1976, now U.S. Pat. No. 4,063,666, entitled Metering Device and Method and assigned to the assignee of the present invention. Other devices utilize mechanical means for providing a measured quantity. Such devices are complex and expensive.

A device for measuring and pouring a given volume of a heavier-than-air fluid from a fluid source includes a fluid storage chamber for receiving a volume of fluid greater in value than the given volume via an opening when the chambers are in an inverted orientation. A fluid volume measuring chamber smaller than, secured to, and in fluid communication with the storage chamber receives the fluid stored in the storage chamber when the chambers are placed in an upright orientation. Th opening has a predetermined spaced relationship with respect to the measuring chamber for determining the given volume by overflowing fluid in excess of the given volume from the chambers when the chambers are in the upright orientation. Means are provided in fluid communication with the measuring chamber for receiving and pouring the measured given volume when the chambers are in the inverted orientation.

IN THE DRAWING

FIG. 1 is a side elevation view of a pouring and metering device constructed and operated in accordance with an embodiment of the present invention, FIG. 2 is a side elevation sectional view through the device of FIG. 1, FIG. 3 is a plan sectional view through the device of FIG. 1 taken along lines 3—3, and FIG. 4 is a side elevation sectional view of a second embodiment of a volume determining member for use in the device of FIG. 1.

In FIG. 1, metering spout 10 is threaded to a bottle 12 and is shown in the upright position with respect to gravity. The spout 10 is a passive device (no moving parts) which automatically provides a measured volume of liquid stored in bottle 12 when the bottle 12 is inverted from the position shown in the direction 14 to a pour position. Each time the bottle is replaced to the upright position, FIG. 1, spout 10 stores and measures a volume of liquid which is almost instantaneously dispensed when the bottle 12 is tipped to the inverted position. As will be described, spout 10 also includes a feature by which the liquid may be poured continuously through the spout in addition to providing a premeasured volume. This continuous pour feature is especially valuable in those instances where intermittent "shots" are not desired and a continuous pour is desired. Further, upon completion of the continuous pour mode, when the bottle 12 is reverted to the upright position, FIG. 1, the spout 10 is once again ready to pour a premeasured volume.

With reference to FIGS. 2 and 3, spout 10 is formed of three thermoplastic members 14, 16 and 18. The separate members 14, 16 and 18 are provided for the purpose of ease of manufacture from suitable thermoplastic molds and for simplicity of construction. The members are readily molded in a conventional manner as known in the thermoplastic molding art and comprise three relatively simple pieces with no moving parts which readily assemble and which may be secured by a suitable cement (not shown).

Prior to discussing the construction of each of the members 14, 16 and 18 as separate pieces, the following description concerns the general construction and operation of the spout. Spout 10 includes an upper storage chamber 20, a lower liquid volume measuring chamber 22 in fluid communication with upper chamber 20 through a dump hole 24 disposed in the bottom wall 26 of chamber 20. Disposed above wall 26 is a second bottom wall 28. Wall 28 is raised above wall 26 by a stanchion 30 through which is disposed tapered hole 32 which provides fluid communication between the bottle 12 interior 34 and chamber 20. Chamber 20 is defined by bottom wall 28, outer wall 36, and inner upstanding side wall 38 which is joined to wall 36 at the sides and top, and bottom wall 28 at the lower most edge. Integral with wall 38 is vent tube 40 which extends below wall 26 into the interior 34. The exterior wall of tube 40 also defines part of chamber 20. Vent tube 40 is open at the upper end (through wall 36) to the ambient and at the lower end (in interior 34) tapers to a small vent aperture 42. Wall 38 with tube 40 divides the upper interior volume of the spout into a second chamber 44 which is further defined by outer wall 37, top wall 46, and bottom wall 26. A hole 48 is provided in wall 26 between chamber 44 and chamber 22 for providing immediate emptying into chamber 44 of at least a portion of the liquid 50 stored in chamber 22 when the spout is tipped in direction 14 as will be explained. Disposed in top wall 46 is a suitable apertured nozzle 52 for pouring the measured volume of liquid 50 through chamber 44 into the ambient when the spout is tipped in direction 14.

Chamber 22 is a ring shaped chamber which straddles the upper neck of bottle 12. The outer wall of chamber 22 is formed by substantially cylindrical walls 36" and 36'. Wall 36" depends downwardly from walls 36 and 37 via intermediate wall 36'. The lower most edge of wall 36" is joined to an inner concentric substantially cylindrical wall 54 via bottom wall 62. Inner wall 54 terminates at its upper end in a relatively thicker internally threaded section 56 which is threaded to receive the threads of a typical bottle 12. A gasket 58 is disposed between the bottle 12 upper lip and the underside of bottom wall 26 to bottle 12 interior 34. Tube 40 extends through wall 26 in a fluid tight seal with wall 26. Thus empty prior to chamber 20 filling. The time interval between the emptying of chamber 44 and the filling completely of chamber 20 is preferably set in the range of about 1-4 seconds. This interval can be altered as desired by altering, for example, the volume relationships of chambers 22 and 20. It is to be understood that once chamber 20 fills completely, liquid will continuously flow through hole 24 to hole 48 into chamber 44 and out nozzle 52. At this time there will be no longer a measured volume but a continuous pouring of liquid until such time the bottle is reverted to the upright position. It will thus be apparent that the end of the pouring of the measured volume is signaled by a ceassation of flow of liquid through nozzle 52 for that set time interval of a few seconds. During that time interval, the bottle 12 may be reverted to the upright position. In this instance, an accurate, premeasured volume of liquid will have been poured and measured by the spout 10. Should it be desired to provide a continuous pour of liquid, then the bottle need only remain in the inverted position until the end of the flow delay time interval. During this time chamber 20 fills completely and liquid henceforth will flow out nozzle 52 until the bottle is placed upright.

Once the bottle is placed in the upright position, then the measuring action described above will repeat. In essence, the liquid in chamber 20 will pour through hole 24 into chamber 22 overflowing into hole 32 as described above providing a premeasured volume for the next pour.

As mentioned above, the spout 10 is provided with three members 14, 16 and 18. Member 16 includes bottom wall 28, stanchion 30, and peripheral wall 36' molded integral with bottom wall 28. Also molded integral with bottom wall 28 is lower vent tube section 40'. Disposed in the upper edge of wall 36' is shoulder 70 for interlocking therewith cylindrical wall 36 at the lower most edges of walls 36 and 37. Interlocked with the upper end of lower tube section 40' is upper tube section 40" which is molded integral with walls 36, 37 and 46, and nozzle 52. Stanchion 30 is a cylindrical member depending downward from wall 28 which is cemented to a suitable hole 80 in wall 26. Tube section 40' is cemented to a suitable hole 82 in wall 26. Walls 26, 54, 62 and 36" and section 56 form member 18. Walls 36' and 36" are interlocked at a suitable shoulder 84 in wall 36'. It would thus be apparent that three simple molded thermoplastic members inexpensively manufactured are readily cemented together to form spout 10.

Conveniently, member 16 may be provided in a number of different configurations wherein the dimension d, FIG. 2, may have different values while utilizing members 14 and 18 of an identical configuration of that shown and described in connection with FIG. 2. For example, in FIG. 4, member 100 may replace member 16 of FIG. 2. It will be noted the vent tube section 40' hole 42 may be the same in construction as that of the corresponding tube section of member 16. Member 100, however, has a relatively narrow wall 36" disposed between shoulders 70' and 84' as compared to wall 36', FIG. 2. Bottom wall 28' has a lower most surface 102 which is contiguous with the upper surface of wall 26. Stanchion 30 is absent in this construction. As a result the dimension d is reduced. This construction reduces the volume of chamber 22 accordingly. By providing a number of differently constructed members 100 having outer walls of different heights such as walls 36' and 36" and a bottom wall 28 disposed different distances d above chamber 22, with stanchions 30 of different lengths to connect walls 28 and 26, a number of different predetermined volumes can be provided chamber 22 with few parts. It is to be understood that such modifications to member 16 and member 100 may be provided by one of ordinary skill in the fluid mechanics art.

What is claimed is:

1. A device for measuring and pouring a given volume of a heavier-than-air fluid from a fluid source comprising:
    a fluid storage chamber adapted to be connected to said source for receiving from said source by gravity a volume of said fluid greater in value than said given volume through a first opening in said storage chamber when said storage chamber is in a first inverted orientation,
    a fluid volume measuring chamber smaller than, secured to, and in fluid communication with said storage chamber for receiving fluid stored in said storage chamber when said chambers are placed in a second upright orientation, said first opening having a predetermined spaced relationship with respect to said measuring chamber for determining said given volume by overflowing fluid in excess of said given volume from said chambers when said chambers are in said second upright orientation, said chambers having a common fluid port for transfering said fluid from said storage chamber to said measuring chamber, said common fluid port having a first transverse area, said opening having a second transverse area smaller than said first area for permitting said given volume of fluid to flow into said measuring chamber,
    vent conduit means positioned in direct fluid isolation from each said chambers and secured to at least one of said chambers for venting said source with ambient air when said storage chamber is connected to said source, and
    means in fluid communication with said measuring chamber for receiving and pouring said given volume to the ambient when said chambers are in said inverted orientation.

2. The device of claim 1 wherein said first transverse area is greater than said second transverse area by about at least 4:1.

3. The device of claim 1 wherein said receiving and pouring means includes a pour chamber having a fluid transfer port, said transfer port being disposed between said pour chamber and said measuring chamber for transfering fluid from said measuring chamber to said pour chamber when in said inverted orientation, said common port being disposed adjacent one side of said storage chamber and said receiving and pouring means being disposed adjacent the side of said device opposite said one side.

4. A fluid pouring and metering device comprising:
    a hollow housing including a side wall, a top wall, and a bottom wall,
    an upstanding wall disposed in the hollow of said housing connected to said walls for dividing said housing into first and second chambers,
    said bottom wall having first, second and third openings, said first opening being disposed in communication with said first chamber, said second and third openings being disposed in communication with said second chamber, and
    a third chamber depending from said side and bottom walls, said third chamber being in fluid communication with said first and third openings, said second chamber being greater in volume than said third chamber, said second opening being smaller in transverse area than said third opening by an amount such that fluid disposed in and flowing from said second chamber through said second and third openings by the force of gravity when said second chamber is disposed above said third chamber with respect to gravity fills said third chamber to a minimum level defined by the position of said second opening, said minimum level defining a given volume in said third chamber whereby inversion of said third chamber above said first chamber permits the flow of said given volume into said first chamber through said first opening to provide a metered volume of said fluid.

5. The device of claim 4 wherein said third chamber includes first and second concentric annular walls connected at one end to form a hollow annular trough, the other ends of said first and second walls being respectively connected to said side and bottom walls.

6. The device of claim 4 further including means secured to said housing for receiving and releaseably securing a fluid container in communication with said second opening, and vent means secured to said housing for providing a fluid vent conduit depending from said bottom wall adjacent said second opening in fluid communication with the interior of said container when secured to said housing.

7. The device of claim 4 wherein said first and third openings are disposed diametrically opposite each other in said bottom wall.

8. The device of claim 4 wherein said top wall has a fourth opening in fluid communication with said first chamber and the ambient.

* * * * *